Nov. 8, 1938.  W. C. WYLAND  2,135,778
MULTIPLE EGG FEEDING AND TILTING DEVICE
Filed July 3, 1935  3 Sheets-Sheet 1
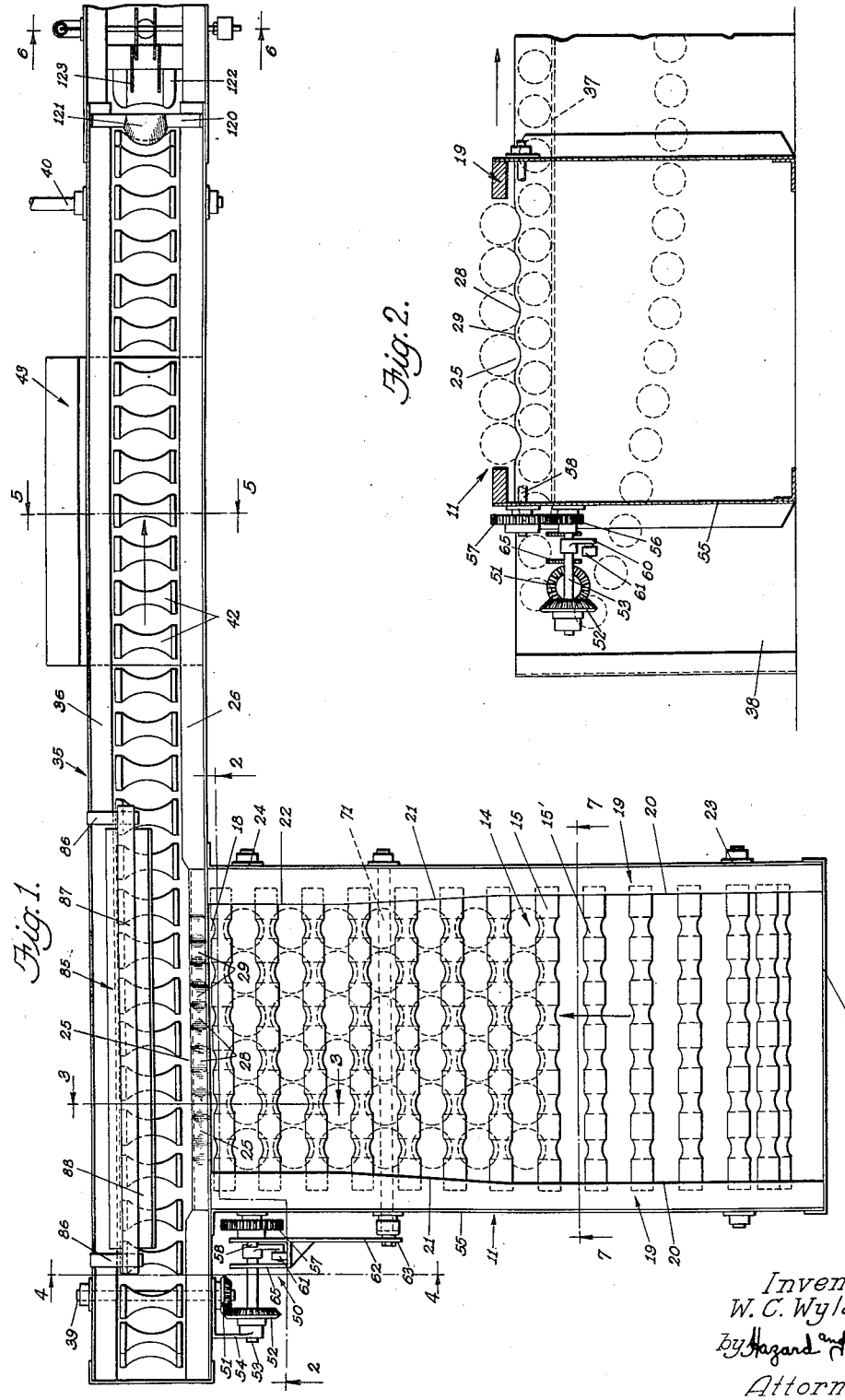
Inventor
W. C. Wyland
By Hazard and Miller
Attorneys.

Nov. 8, 1938. W. C. WYLAND 2,135,778
MULTIPLE EGG FEEDING AND TILTING DEVICE
Filed July 3, 1935 3 Sheets-Sheet 2

Inventor
W. C. Wyland
by Hazard and Miller
Attorneys.

Nov. 8, 1938.  W. C. WYLAND  2,135,778
MULTIPLE EGG FEEDING AND TILTING DEVICE
Filed July 3, 1935   3 Sheets-Sheet 3

Inventor
W. C. Wyland
by Hazard and Miller
Attorneys.

Patented Nov. 8, 1938

2,135,778

UNITED STATES PATENT OFFICE

2,135,778

MULTIPLE EGG FEEDING AND TILTING DEVICE

William C. Wyland, Alhambra, Calif., assignor to J. W. Wyland & Sons, San Gabriel, Calif., a corporation of California Application July 3, 1935, Serial No. 29,673

15 Claims. (Cl. 198—32)

My present invention relates to a machine for feeding eggs in multiple units and in depositing the eggs on a single straight line conveyor, a row of eggs being transferred at one time. My present invention may be considered as a further development of that of my application for Egg candling and sizing machine, Serial No. 693,608, filed October 14, 1933, matured to Patent No. 2,070,980, issued Feb. 16, 1937.

A main object and feature of my present invention is to transfer eggs onto a single line straight moving conveyor in such a manner that the eggs all lie in the same direction, that is, the eggs will lie on the single straight line conveyor with their long axes transverse to this conveyor and with the butts of eggs having the air cell adjacent one side of such conveyor and the point adjacent the other side. A result obtained from conveying the eggs all pointed in the same direction, that is with their butts having the air cell all on one side and the points at the other, is that it much facilitates the procedure of candling eggs and also in grading eggs by weight when this is done by an accurate grading machine.

With my present invention the single straight line conveyor may be used in connection with an egg candler such as embodied in my patent application above mentioned and in the issued Patent No. 1,864,034, for Egg candling machine, dated June 1, 1932. Also the straight line conveyor causes a more accurate grading of eggs by egg grading machines by weight such as described in connection with my patent application Serial No. 749,766, for Egg grading machine by weight, filed October 14, 1934, matured to Patent No. 2,112,259, issued Mar. 29, 1938, and issued patents to J. W. Wyland, No. 1,728,463, September 17, 1929, for Egg sizing machine by weight, and No. 1,954,164, April 10, 1934, for Egg sizing machine by weight. Where the eggs all lie in the same direction when passing through an egg candling machine it is unnecessary for the operator to reverse the position of the eggs and he can more quickly compare the condition of the air cell and also of the yoke of the egg when the eggs all lie in the same direction than when they have their butts indiscriminately on one side or the other of the conveyor of the egg candling machine. Also in the grading of the eggs by weight, when the butts are all in the same direction, a more accurate movement is obtained of the pivoted weighing scale and the counterbalance weight of such scale than when the butts are indiscriminately on one side or the other of the track of the conveying scale.

A more particular object and feature of my present invention in transferring eggs in a multiple row to a single straight line conveyor, consists in employing a multiple row conveyor in which the eggs are maintained in the relative position in which they are deposited on this conveyor; and it is the practice to deposit the eggs a multiple number at a time with the points down and the butts with the air cells uppermost. This multiple conveyor is preferably of a slat type for supporting the eggs so that such eggs are not rotated, this being in contradistinction to the manner of feeding the eggs in the multiple conveyor of my patent application first mentioned above, that is, Serial No. 693,608.

An important feature of my present invention resides in a positive transfer mechanism for shifting the eggs from the multiple row conveyor onto the single row conveyor, this latter preferably being of the spool type and the eggs are positively transferred by a pusher mechanism and this pusher mechanism engaging all of the eggs of a row simultaneously and shifting these over a transfer plate so that the butts with the air cell lead in this transfer, the pusher device operating on the points of the eggs. Also in this connection I use a padded guide structure to engage the eggs at the moment of transfer and prevent them turning end over end. Thus the eggs are deposited on the single row spool conveyor with their butts remote from and their points towards the multiple row conveyor. The speeds of these conveyors are adjusted so that a complete unit of eggs is moved laterally of the multiple row conveyor before a following row is in position for transfer.

Further detail features of my invention reside in the pusher mechanism, this being actuated by a timed driven gear operating in conjunction with the interconnected drive of the multiple feed conveyor and the single row conveyor. This timed gear operates a first link which in turn actuates a double lever and this double lever through a link and pusher plate pushes the eggs from the multiple feed conveyor at the moment when each row of eggs reaches the end of such conveyor and the upper run of the conveyor dips downwardly at the end of its travel.

My invention is illustrated in connection with the accompanying drawings, in which, Fig. 1 is a plan of the machine;

Fig. 2 is a vertical transverse section on the line 2—2 of Fig. 1 in the direction of the arrow through the end portion of the multiple egg feeding machine;

Figure 3:
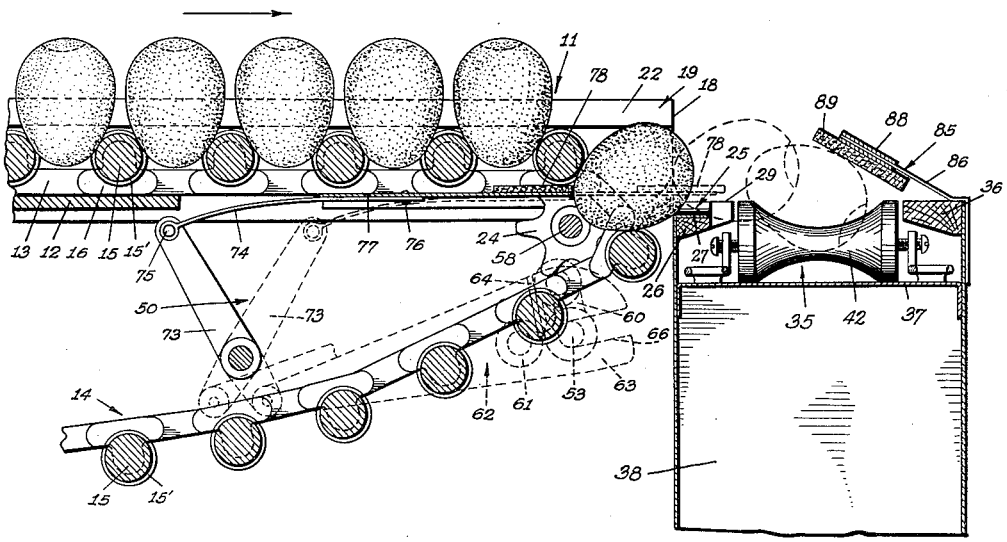
Fig. 3 is a vertical longitudinal section on the line 3—3 of Fig. 1 in the direction of the arrows, to illustrate the transfer of eggs from the multiple row to the single row conveyor.

Referring first to the general construction of Figs. 1 through 4, this shows a multiple row egg feeding machine designated by the assembly numeral 11. This has a suitable frame structure with a pair of marginal tracks 12 on which the upper run 13 of an endless chain conveyor 14 may operate. This has two parallel chains and between these chains there are slats 15. Such slats are preferably cylindrical with grooves or notches 15' to center the eggs, but are mounted in the links 16 of the chain in such a manner that they do not rotate. In fact, with this machine it is desirable that there be no rotation of the slats except possibly such slight turn as may be given by the frictional contact of eggs with the slats. This multiple conveyor has a feeding-in end 17 and a discharge end 18. At each edge there is a centering and guiding side cover plate 19. This cover plate at the feeding portion has parallel edges 20 followed by inwardly tapering guide edges 21 and further parallel guide edges 22. The distance between the edges 20 is greater than that between the two edges 22. This endless conveyor having slats has its chains operating over sprockets 23 adjacent the infeeding end and 24 adjacent the discharge end.

In supplying eggs or depositing them on this multiple conveyor, it is customary to handle eggs from a crate, the crates or cases usually contain thirty dozen eggs arranged in layers of thirty-six eggs each, the eggs of each layer being separated by cardboard spacers or frames making six rows of eggs with six egg spaces per row. The eggs are usually packed in the crate with the small end down and the butt end with the egg cell uppermost, this being to prevent damage to the air cell at the top by pressure of the fluid of the egg thereon, either while in transit or in storage.

One layer of eggs is deposited at a time on the slowly moving upper run of the slat conveyor at the portion between the spaced guide edges 20. The points of the eggs feed between the slats and at the moment of depositing the eggs the separating cardboards or other structure maintains the eggs properly separated. It will be understood, however, that if desired the eggs may be inverted and deposited on the conveyor with the butt ends down. The converging edges 21 are for the purpose of preventing the eggs tilting sideways as to each row after the container has been lifted from the multiple set of eggs; these as above mentioned usually being six eggs at a time. The parallel edge 22 thus retains the eggs from tilting an undue amount, causing them to travel on the upper run of the slat conveyor with their long axes substantially vertical and preferably with the butt uppermost.

At the discharge end of the multiple feed conveyor I employ a transfer apron 25. This usually employs a wood underframing 26 with a smooth metal plate 27 forming the top surface and this plate is arranged with six shallow grooves 28 shaped with a concave curvature of substantially the same curve as the circular diameter of the usual sized eggs at right angles to their long axes. There are thus a series of elevated ridges 29 in the transfer apron which prevent one egg from rolling into the concave depression maintained for the next adjacent egg.

The single row conveyor designated by the assembly numeral 35 utilizes the underframing 26 on one side and a rail 36 on the opposite side and roll supporting plates 37, these being mounted on a suitable stand 38 having sprocket gear shafts 39 and 40 (note Figs. 1 and 3).

The shaft 40 is preferably driven by a power source. Each of the shafts has a sprocket wheel over which operates the pair of chains 41 rotatably carrying the rollers 42. A portion of this conveyor operates over the candler 43 which candler may have slidable tracks 44 if desired. The rolls of the single line conveyor are illustrated as of the spool type in order to accomodate eggs with their long axes transverse to this single line conveyor and to rotate the eggs on such axes.

The transfer mechanism for shifting eggs between the slat type of multiple egg conveyor and the single straight line rotating spool conveyor, is designated by the assembly numeral 50 (note particularly Figs. 1, 2, 3 and 4.) This is power driven by the shaft 39 carrying a driven sprocket gear of the single line conveyor 35, which shaft has a bevelled gear 51 meshing with the bevel gear 52 on a drive shaft 53, this shaft being journaled in a bracket 54 and also in one side 55 of the frame of the multiple conveyor 11. The shaft 53 has a pinion gear 56 thereon (note Fig. 4) which pinion gear meshes with a driven gear 57 mounted on a sprocket gear shaft 58 carrying the sprockets 24 at the discharge end of the multiple feed conveyor 11. By a proper gear ratio this gives a drive from the single line conveyor to the multiple row conveyor at a reduction of 6 to 1, this being to accomodate a transfer of six eggs in a single row at one time.

Keyed to the shaft 53 there is a rotating arm 60 having a roller 61 thereon which roller actuates a first link 62, this link being formed of a long plate 63. A bearing plate 64 and a side arm 65. The plate 63 and the side arm 65 each have a slot 66 leading from one end, the shaft 53 fitting in this slot so that the plate 63 and the side arm may have a longitudinal movement during the time the roller 61 contacts with the bearing plate 64 in the rotation of the arm 60. The sprocket 56 and this arm rotate in the direction of the arrow 67 (note Fig. 4).

A rocker arm 70 is keyed or otherwise secured to a transverse rock shaft 71, this being journaled in opposite sides of the frame of the multiple conveyor 11, and the plate 63 of the link 62 is connected by the pivot 72 to the lower end of this arm 70. Thus in each rotation of the shaft 53 and the roller 61 there is an oscillating motion of the rock shaft 71.

This rock shaft has two rocker arms 73 connected thereto on the inside of the frame of the multiple conveyor 11. These arms extend upwardly and have a resilient link 74 connected to the upper end of each arm 73 by the pivotal connection 75. These resilient links may be made of spring wire or of a flat piece of spring steel and are each connected by a rivet 76 to a pusher plate 77. The pusher plate slides on a suitable supporting structure such as a portion of the marginal tracks 12. This pusher plate extends underneath the slats 15 on which the eggs are supported and at the forward end of this plate there is a pusher pad 78. This pad projects slightly beyond the end of the pusher plate. It is preferably flat and may be made of felt or rubber or the equivalent. The pusher plate and the pad operate between the sprockets 24 which operate the chains 13 of the multiple egg conveyor. The forward end of the pusher plate with the pad 78 is located slightly above the transfer apron 25 having a clearance above the elevated ridges 29 of this plate as shown in Fig. 3. The pusher plate is retracted by a tension spring 79 of which there are preferably two, one attached to each arm 73 and to a fixed part of the machine such as a side of the frame structure of the multiple conveyor 11. These springs also force the link 62 forwardly to bring the bearing plate 64 into position to be engaged by the roller 61 in its rotation.

The device to prevent the eggs tilting end over end employs a guiding structure 85. This has a pair of arms 86 attached to the side frame of the single row conveyor and extending above and over the rail 36. These arms support the ends 87 of a fabric web 88 to which is secured a felt or similar pad 89. This pad therefore extends upwardly at an angle to the axis of the spools 42 of the single row conveyor.

The operation of the device so far described is as follows: As above mentioned the eggs are placed on the multiple row conveyor while this is operating adjacent the infeeding end 17. They are usually transferred from an egg case by a transfer tray or the like, in which six eggs are arranged in a row and six rows at a time. The side edges 20 of the cover plates 19 are spaced sufficiently wide apart to accommodate the eggs and the device used to transfer the eggs as a unit from the case, and also to prevent the eggs from tilting when this transfer device is removed. As the multiple number of eggs are fed toward the discharge end of the multiple conveyor, if they tend to tilt, the converging edges 21 tend to straighten the eggs and the parallel edges 22 retain the eggs with their long axes vertical. As above mentioned it is the usual practice to deposit the eggs with the butt upwardly, thus the air cell is uppermost.

Figure 4:
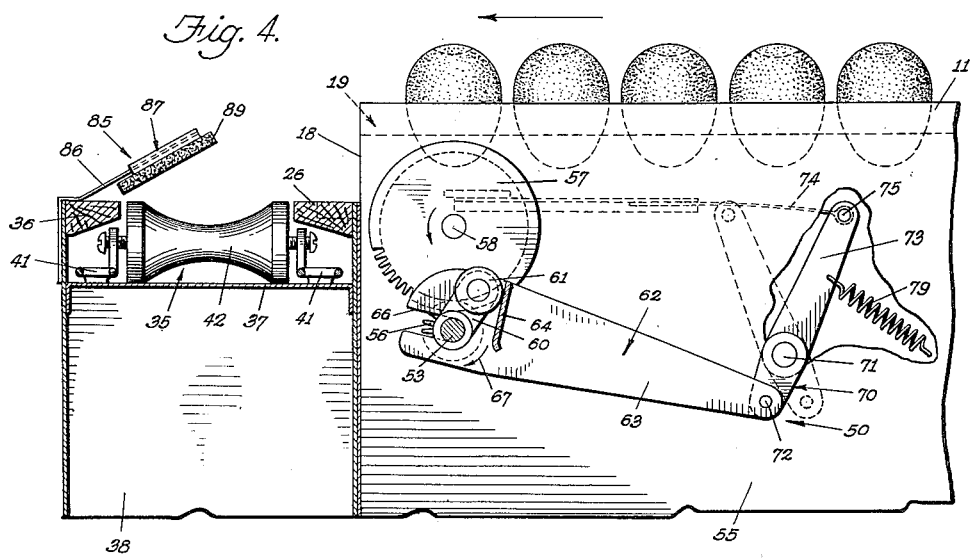
Fig. 4 is a vertical longitudinal section taken on the line 4—4 of Fig. 1 in the direction of the arrows, showing a part of the operating mechanism for the pusher transfer device in elevation.

The position of the eggs in traveling and at the discharge end of the multiple row conveyor, is illustrated in Fig. 4 and when tilted in Fig. 3. As the endless chain having the slats to support the eggs passes around the sprocket wheels 24 at the discharge end of this conveyor, the eggs tilt with their long axes inclined. At this moment the rollers 61 contact the bearing plate 64 and thrust the link 62 forwardly, which through the medium of the rock shaft 71 and the arm 73, gives a forward movement to the pusher plate 77 and its pad 78. The pad engages the row of eggs adjacent their points, the eggs are thus thrust over the transfer apron 25, each egg sliding in a groove 28. This forward push to the eggs is given in proper timing to the single row spool conveyor so that at the moment the eggs are pushed over the transfer apron, the spools are positioned to receive the eggs. As the spools have a concave curvature, the eggs slide by gravity off the transfer apron to the space between the adjacent spools. If the eggs tend to tilt end for end, they contact the pad 89 of the guiding structure 85 which prevents the eggs from tilting end for end and locates substantially all of the eggs at the large or butt end remote from the multiple egg conveyor. As the spools 42 are rotating, the eggs are brought into a position with their long axes transverse to the single spool conveyor and in such position are carried over the egg candler 43.

It will be noted by reference to Fig. 3, that the pusher plate 77 and its pad 78 pass between two adjacent slats of the multiple conveyor at the moment of pushing a row of eggs over the apron 25. The forward movement of this pusher plate however, and the retracting action by the spring 79, is so rapid that the plate is completely retracted while each slat passes over the end of the plate. Thus there is no opportunity of the pusher plate being caught by a slat as it moves downwardly from upper to the lower run of the multiple egg conveyor.

Figure 5:
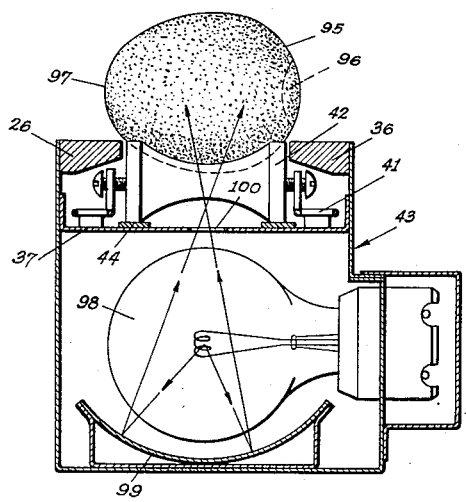
Fig. 5 is a vertical transverse section on the line 5—5 of Fig. 1 in the direction of the arrows, through a portion of the egg candling part of the machine.
Figure 7:
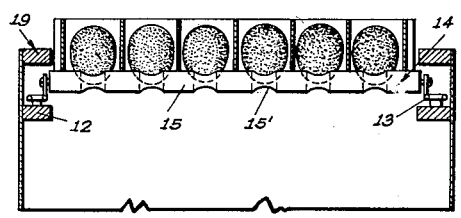
Fig. 7 is a vertical transverse section on the line 7—7 of Fig. 1 in the direction of the arrows, illustrating the tray for depositing the eggs on the multiple row conveyor.

Fig. 5 shows the advantage of having the eggs all positioned with their butt end on one side of the candler as they pass through such candler. The butt end of the egg is indicated by the numeral 95, having the air cell 96 at such end and the point of the egg by the numeral 97. The direct light from the lamp 98 and the light reflected from the reflector 99 passes through a slot 100 in the plate 37. Thus there is a similar illumination given to all of the eggs and to the air cell at the end. This therefore facilitates the correct candling of the eggs and does not require the candler to judge as to the condition of the air cell should the eggs be reversed indiscriminately. Moreover, it avoids the necessity of the candler manually changing the position of the eggs as they frequently do in order to have the butt end of all the eggs on the same side of the egg candling machine.

Figure 6:
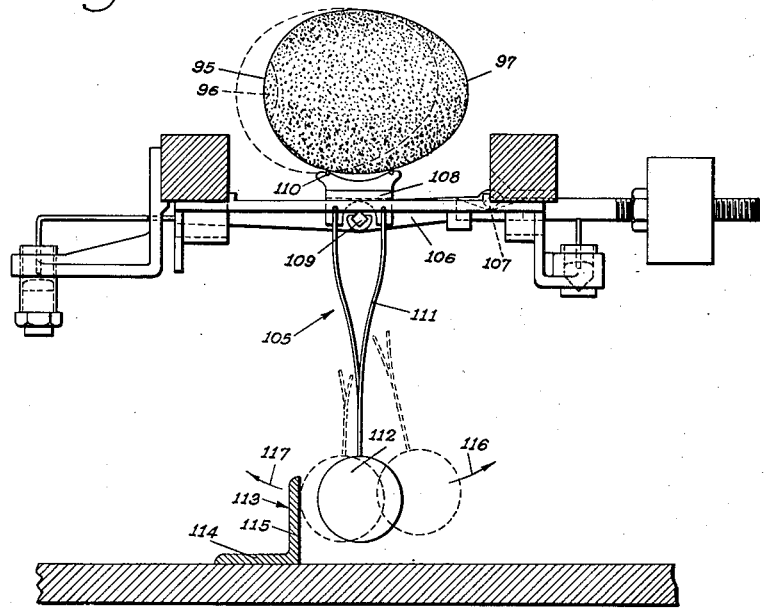
Fig. 6 is a vertical transverse section on the line 6—6 of Fig. 1 through a portion of an egg weighing machine.

In Fig. 6 I illustrate the action of a weighing scale and the benefits of having the butt end of the eggs always on one side of the scale pan. In this illustration a weighing beam assembly is indicated by the numeral 105. This may be made in accordance with the various machines for grading eggs by weight above noted. This shows a scale beam 106 pivoted at 107. Mounted on the beam there is the scale or scale pan 108 pivoted at 109 to the beam, this pan having tracks 110 on which the eggs may roll. Attached to the scale pan there is a pendulum arm 111 having a pendulum weight 112. With my invention I use a damper stop 113 which is shown as an angle having a lower flange 114 secured to a fixed structure of the grading machine and having a buffer or damper arm 115.

In the operation of these grading machines by weight, when an egg rolls on a scale pan, on account of the butt end being heavier than the pointed end, it causes a tilting of the scale pan and a swinging of the pendulum arm. As the egg rolls off the scale pan the pendulum arm would continue to swing or oscillate unless stopped by the damper 113. Where the butts of the eggs are always on one side of the scale pan, the damper may be placed quite close to the normal position of the pendulum weight which is illustrated by the solid lines of Fig. 6. The direction of swing when an egg is supported on the scale is in the direction of the arrow 116 and on the return usually the pendulum oscillates beyond its normal position in the direction of the arrow 117, but in such swing it meets the damper arm 118 and is quickly brought to rest. If the eggs came on the scale pan with the butt ends in an opposite direction to that shown, the first swing would be in the direction of the arrow 117 and the swing of the pendulum would be blocked by the damper 113. Where the eggs roll on the scale pan in the position illustrated, the first swing due to the heavy butt end of the egg is in the direction of the arrow 116.

The manner of transferring the eggs from the single line conveyor to the egg weigher of the assembly 105, is by means of a transfer plate 120 (note Fig. 1) this having a depressed section 121, the eggs being received by this transfer plate when the upper run of the single spool conveyor dips downwardly at the end of its travel. The eggs then pass off the transfer plate 120 to the runway 122 and the fixed tracks 123, rolling from these tracks on to the scale.

Various changes may be made in the details of construction without departing from the spirit or scope of the invention as defined by the appended claims.

I claim:

1. In an egg handling machine, the combination of a multiple row conveyor having chains with slats with egg centering notches secured thereto, the upper run of the conveyor being adapted to support eggs with a row of eggs between adjacent slats, a confining means at opposite sides of the upper run to retain the eggs with their long axes vertical, the said slats being non-rotatable, sprocket wheels guiding the chains at the discharge end from the upper to the lower run of the conveyor causing a tilting of the eggs, a reciprocating pusher plate operatively connected with the conveyor and timed to contact eggs as each slat in succession passes from the upper to the lower run of the conveyor and to positively push the eggs free of the slats and guiding means positioned to engage the upper sides of the eggs to cause the eggs to travel in the direction of their long axes at the moment of being discharged from the conveyor.

2. In an egg handling machine as claimed in claim 1, a horizontal single row conveyor positioned at the discharge end of the multiple row conveyor and operating transversely therewith but below the said upper run which is horizontal, the single row conveyor having means to receive and to support eggs with their long axes horizontal and transverse to the single row conveyor, and means to interconnect the multiple row conveyor and the single row conveyor whereby a row of eggs is transferred from the multiple row conveyor at the proper instant to be received by the single row conveyor.

3. In an egg handling machine, the combination of a multiple row conveyor with means to support eggs thereon with their long axes vertical, a pusher means to positively discharge the eggs from the multiple row conveyor at its discharge end, a transfer apron located at the discharge end of the multiple row conveyor and having depressions, each to receive an egg, a fixed guide structure located at the discharge end of the multiple row conveyor and spaced from the apron to engage eggs pushed over the apron and prevent such eggs from turning end over end and a receiving means adjacent the guide structure to receive eggs pushed over the said apron.

4. In an egg handling machine, the combination of a multiple row conveyor having means to support eggs and having an upper and a lower run with a discharge end, a single row conveyor having a plurality of spools, two adjacent spools being adapted to support an egg with its long axis horizontal and transverse to the single row conveyor, the single row conveyor operating transversely of the multiple row conveyor, a transfer apron at the end of the multiple row conveyor, located between such latter conveyor and the sides of the single row conveyor.

5. In an egg handling machine, the combination of a multiple row conveyor having an upper and a lower run with means to support eggs with their long axes vertical on the upper run and having a discharge end at the dip of the conveyor from the upper to the lower run, a single row conveyor having a plurality of spools, two adjacent spools being adapted to support an egg with its long axis horizontal and transverse to the single row conveyor, the single row conveyor operating transversely of the multiple row conveyor, a transfer apron at the end of the multiple row conveyor, located between such latter conveyor and the sides of the single row conveyor, and a guide structure having an inclined plate with a pad positioned on the side of the single row conveyor opposite the transfer apron, the said pad extending at least the full length of the slats and being adapted to engage eggs pushed over the transfer apron onto the spools to prevent such eggs from turning end over end.

6. In an egg handling machine as claimed in claim 1, a transfer apron located at the discharge end of the multiple row conveyor and having depressions, each to receive an egg, the said guiding means being located at the discharge end of the multiple row conveyor and spaced from the apron to engage eggs pushed over the apron and prevent such eggs from turning end over end and a receiving means adjacent the guiding means to receive eggs pushed over the said apron.

7. In an egg handling machine as claimed in claim 1, a single row conveyor having a plurality of spools, two adjacent spools being adapted to support an egg with its long axis horizontal and transverse to the single row conveyor, the single row conveyor operating transversely of the multiple row conveyor, a transfer apron at the end of the multiple row conveyor, located between such latter conveyor and the sides of the single row conveyor.

8. In an egg handling machine as claimed in claim 1, a single row conveyor having a plurality of spools, two adjacent spools being adapted to support an egg with its long axis horizontal and transverse to the single row conveyor, the single row conveyor operating transversely of the multiple row conveyor, a transfer apron at the end of the multiple row conveyor, located between such latter conveyor and the sides of the single row conveyor, and the said guiding means having an inclined plate with a pad positioned on the side of the single row conveyor opposite the transfer apron, the said pad extending at least the full length of the slats and being adapted to engage eggs pushed over the transfer apron onto the spools to prevent such eggs from turning end over end.

9. In an egg handling machine, the combination of a multiple row conveyor having chains with slats secured thereto, the upper run of the conveyor being adapted to support eggs in rows between adjacent slats with their long axes vertical, sprocket wheels mounted on a sprocket wheel shaft engaging the said chains and guiding the chains from their upper to their lower run at the discharge end of the conveyor, a driven gear connected to said sprocket wheel shaft, a driving shaft having a complementary gear meshing with the driven gear, an arm connected to the driving shaft and having a roller, a reciprocating link engaged by and reciprocated by the said roller, rocker arms connected to said link, a rectilineally slidable pusher plate having a pad on the end thereof connected to the rocker arms, the said pusher plate being adapted to extend between two adjacent slats as they pass from the upper to the lower run of the conveyor and to push eggs from the conveyor at substantially the moment when the row of eggs have their long axes horizontal.

10. In an egg handling machine as claimed in claim 9, a single row endless conveyor having its upper run moving transversely to the multiple row conveyor and having a drive connection to the said driving shaft of the multiple row conveyor and a guide plate having a pad extending over a portion of the upper run of the single row conveyor to engage eggs pushed from the multiple row conveyor and to prevent such eggs turning end for end.

11. In an egg handling machine as claimed in claim 9, a transfer apron positioned at the discharge end of the multiple row conveyor and having a series of depressions, each to engage and guide an egg, a single row conveyor having a plurality of spools, an adjacent pair of spools being adapted to support an egg on the upper run portion of the spool conveyor, a driving connection between the spool conveyor and the said driving shaft to time the spools to receive eggs when pushed over the said apron, and a guide structure extending partly over the spools to engage eggs received by the spools to prevent such eggs turning end over end.

12. In an egg handling machine, the combination of a first longitudinally continuously movable conveyor having means to support eggs with their long axes vertical, a stationary transfer apron at the discharge end thereof, a second conveyor located at the discharge end of the first conveyor and having means to support eggs with their long axes horizontal and a pusher means operating in connection with the first conveyor while it is moving to positively engage eggs at the discharge end of the first conveyor and push such eggs on to the second conveyor, the eggs being tilted from having their long axes vertical to horizontal at the time of transfer from the first to the second conveyor.

13. In an egg handling machine, the combination of a first endless type of continuously moving conveyor having means operating in connection with the upper run of such conveyor to support eggs with their long axes vertical and for non-rotation of such eggs, the said conveyor having a discharge at the dip from the upper to the lower run of the first conveyor, a stationary transfer apron at the dip, a second conveyor located at the discharge end of the first conveyor, having means to support eggs with their long axes horizontal, a pusher device operatively connected to the first conveyor while it is moving, to positively push eggs from the first to the second conveyor at the moment a portion of the first conveyor dips from its upper to its lower run.

14. In an egg handling machine as claimed in claim 13, a stationary guide means located adjacent the end of the first conveyor and positioned above the second conveyor to engage the leading end of eggs in transfer to the second conveyor and prevent eggs turning end for end, whereby if eggs on the first conveyor have their butt end uppermost, all of such eggs lie on the second conveyor with their butt ends facing in the same direction.

15. In an egg handling machine, the combination of a first endless type of continuously moving conveyor having means to supports eggs with their long axes vertical and for non-rotation on the upper run of the first conveyor, a transfer apron at the discharge end thereof, a second endless conveyor having spools mounted for rotation, a pusher device positioned to engage eggs at the discharge end of the first conveyor while it is moving and to positively push such eggs in transfer over the apron to the second conveyor, the movements of the first and second conveyors and of the pusher device being timed to operate in synchronism, whereby when eggs on the first conveyor have their butts uppermost, all of such eggs are pushed onto the second conveyor with their butts in the same direction.

WILLIAM C. WYLAND.